(12) United States Patent
McQueen (10) Patent No.: US 11,221,545 B2
(45) Date of Patent: Jan. 11, 2022

(54) DISTRIBUTED FOCAL CONJUGATE MULTIPLE INDICATION SYSTEM FOR LONG RANGE APPLICATIONS

(71) Applicant: Datalogic USA, Inc., Eugene, OR (US)

(72) Inventor: Alexander Malcolm McQueen, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 16/232,745

(22) Filed: Dec. 26, 2018

(65) Prior Publication Data

US 2020/0209721 A1    Jul. 2, 2020

(51) Int. Cl.
*G03B 21/14* (2006.01)
*G02B 27/09* (2006.01)
*G03B 21/20* (2006.01)

(52) U.S. Cl.
CPC ....... *G03B 21/142* (2013.01); *G02B 27/0955* (2013.01); *G03B 21/2033* (2013.01)

(58) Field of Classification Search
CPC .............. G03B 21/142; G03B 21/2033; G02B 27/0955
See application file for complete search history.

(56) References Cited

U.S. PATENT DOCUMENTS

| | | | | |
|---|---|---|---|---|
| 4,824,210 A * | 4/1989 | Shimazaki | ........ | G02F 1/133385 348/E5.141 |
| 5,302,983 A * | 4/1994 | Sato | ..................... | G03B 21/132 353/69 |
| 5,706,062 A * | 1/1998 | Stolov | ..................... | G03B 21/10 348/761 |
| 6,761,457 B2 * | 7/2004 | Wada | ................. | G02B 27/0927 348/E5.141 |
| 8,192,028 B2 * | 6/2012 | Heym | ...................... | G09G 3/32 353/13 |
| 8,933,974 B1 * | 1/2015 | Marason | ................ | G09G 3/002 345/690 |
| 8,955,988 B1 * | 2/2015 | Coley | .................. | G03B 21/147 353/101 |
| 9,052,087 B2 * | 6/2015 | Wang | ....................... | F21V 5/04 |
| 9,508,137 B2 * | 11/2016 | Byers | ................. | H04L 65/1083 |
| 2005/0259226 A1 * | 11/2005 | Gilg | ..................... | H04N 9/3185 353/69 |
| 2006/0285080 A1 * | 12/2006 | Kurihara | ................ | G03B 21/16 353/70 |

(Continued)

OTHER PUBLICATIONS

Merklinger, H.M., "The Scheimpflug Principle—Part I," Shutterbug, vol. 22, No. 1, Nov. 1992, 2 pages.

Primary Examiner — Bao-Luan Q Le
(74) Attorney, Agent, or Firm — Cozen O'Connor (57) ABSTRACT

A projection system includes a light source and a lens. The light source includes a first light and a second light that both are positioned within a light source plane. The lens defines a principal axis and a lens plane that is normal to the principal axis. The light source is positioned relative to the lens such that the light source plane is oblique to the lens plane. The orientation of the light source relative to the lens enables the projection system to deliver information to a worker performing a task about the task being performed from a remote location that is outside of the area in which the worker is performing the task.

19 Claims, 6 Drawing Sheets

(56) References Cited

U.S. PATENT DOCUMENTS

| | | | | |
|---|---|---|---|---|
| 2007/0013875 | A1* | 1/2007 | Matsuoka | G03B 21/142 |
| | | | | 353/70 |
| 2009/0046252 | A1* | 2/2009 | Heym | G09G 3/32 |
| | | | | 353/13 |
| 2010/0309443 | A1* | 12/2010 | Cheng | G02B 26/0883 |
| | | | | 353/81 |
| 2013/0265801 | A1* | 10/2013 | Wang | F21V 5/04 |
| | | | | 362/606 |
| 2014/0211171 | A1* | 7/2014 | Huang | G03B 37/04 |
| | | | | 353/34 |
| 2015/0317835 | A1* | 11/2015 | Byers | H04L 65/1083 |
| | | | | 345/633 |
| 2016/0173836 | A1* | 6/2016 | Yu | H04N 9/3105 |
| | | | | 348/208.7 |
| 2016/0370695 | A1* | 12/2016 | Miyasaka | H04N 9/317 |
| 2017/0059971 | A1* | 3/2017 | Takano | G02B 17/0852 |

* cited by examiner

DISTRIBUTED FOCAL CONJUGATE MULTIPLE INDICATION SYSTEM FOR LONG RANGE APPLICATIONS

TECHNICAL FIELD

The present disclosure relates generally to optics, and more specifically to systems and methods of delivering information through visual indications.

DESCRIPTION OF THE RELATED ART

Often it is advantageous to display visual indications to a person performing a task to provide feedback or other information about the status or progress of the task. Indicators can be used to generate and deliver a form of visible light emission to the person performing the task. The indicators are often placed on a piece of apparatus being used by the person, where the attention of the person is concentrated. In some cases, however, it is not practical to place the indicators where the operator is typically looking, as the indicators would be obstructing the performance of necessary tasks. In such the indicators are removed from the immediate work area and the visual indications are projected to the location of the person from a distance.

Depending upon the work being performed, the visual indications may need to be visible over a wide range of distances and may need to display multiple conditions. Known techniques to project visual indications from a remote location require relatively high power consumption and result in a limited field of view and unclear images.

BRIEF SUMMARY

One embodiment of a system to extend a focal region over which an indication projected from a light source is reasonably "in focus" includes the light source tilted relative to a projection lens. Desired characteristics, such as the position of the plane of focus, may be achieved through unique application of the Scheimpflug rule to a visual indication system, which includes lens focal length and distances of the nearest and farthest points of the tilted light source from the projection lens. Depending upon the desired appearance of the projected indication, the system may be used at very low f-numbers, resulting in high efficiency and bright indications over a long depth-of-field.

A projection system may be summarized as comprising: a lens including an optically powered surface, the lens defining an optical center and a lens axis, the lens axis intersecting the optically powered surface and the optical center such that the lens axis defines a degree of rotational symmetry along the lens axis, and the lens further defining a lens plane that is normal to the lens axis; and a light source including a first light and a second light, the first light spaced from the second light along a direction oblique to the lens axis, the light source defining a light source plane that intersects both the first light and the second light, wherein the light source plane is oblique to the lens plane.

A method of projecting information to a first location may be summarized as comprising: positioning a lens at a second location that is remote from and within line of sight of the first location, the lens including an optically powered surface, the lens defining an optical center and a lens axis, the lens axis intersecting the optically powered surface and the optical center such that the lens defines a degree of rotational symmetry along the lens axis, and the lens further defining a lens plane that is normal to the lens axis; and positioning a light source relative to the lens at a third location such that a light source plane is oblique to the lens plane, wherein the light source plane intersects both a first light of the light source and a second light of the light source, wherein the first light is spaced from the second light along a direction oblique to the lens axis.

A method of providing information to a worker performing a task about the task being performed may be summarized as comprising: positioning a lens such that the lens is remote from a path along which the worker travels during performance of the task, the lens including an optically powered surface, the lens defining an optical center and a lens axis, the lens axis intersecting the optically powered surface and the optical center such that the lens defines a degree of rotational symmetry along the lens axis, and the lens further defining a lens plane that is normal to the lens axis; and positioning a light source relative to the lens such that a light source plane is oblique to the lens plane, wherein the light source plane intersects both a first light of the light source and a second light of the light source, the first light spaced from the second light along a direction oblique to the lens axis.

The method may further comprise identifying a first characteristic of the task being performed; selecting one output of the light source of a plurality of outputs of the light source based on a result of identifying the first characteristic; and projecting the one output from the light source, through the lens, and to the worker.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with optical technologies have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

The term "plurality" as used herein means more than one. The terms "a portion" and "at least a portion" of a structure include the entirety of the structure.

The headings and Abstract of the Disclosure provided herein are for convenience only and do not interpret the scope or meaning of the embodiments.

Figure 1:
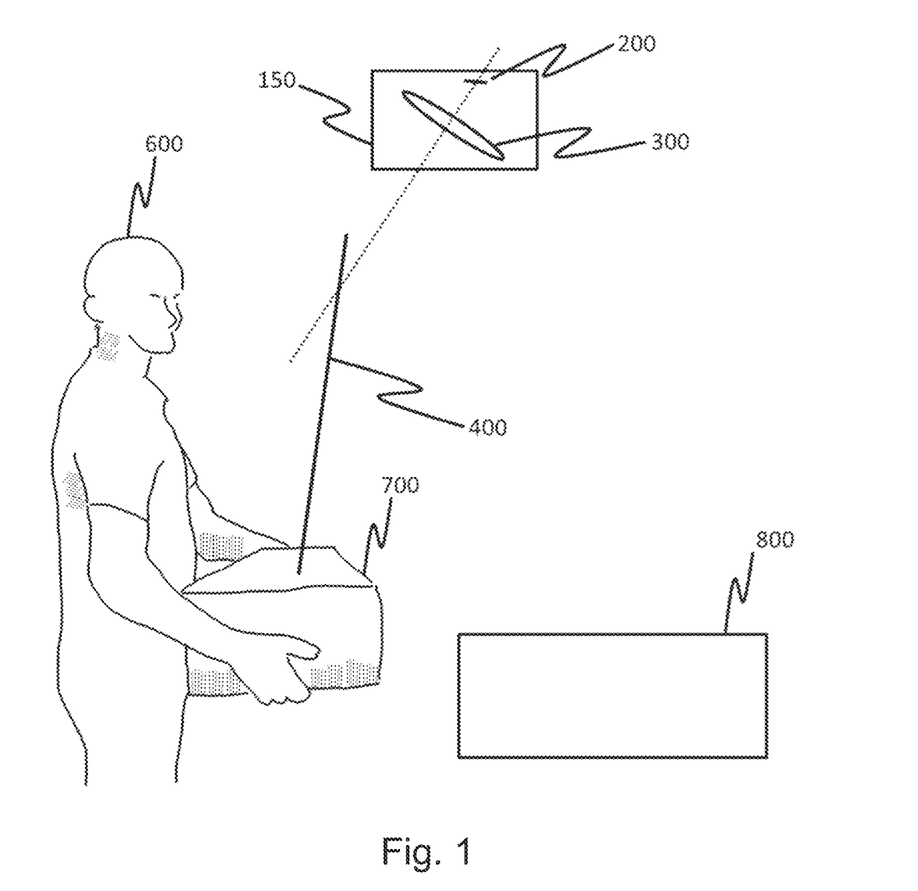
FIG. 1 is a side elevation, schematic view of a projection system providing information to a worker about a task being performed, according to one embodiment.

Referring to FIG. 1, a projection system 150 can be used to deliver information to a worker 600 performing a task about the task being performed. Delivery of information to the worker 600 about the task being performed by the worker 600 may result in an increase in the worker's 600 accuracy, efficiency, or both as related to the task being performed.

The projection system 150 can be mounted at a location that is remote from the worker 600. According to one embodiment of the disclosure, the projection system 150 can be mounted outside of a volume of space within which the worker 600 moves during performance of the task. The volume of space can be defined by an area, for example a length and a width on a floor of a building, and the volume of space can further be defined by a height, for example the height of the worker 600.

According to one embodiment, the projection system 150 can be mounted to a wall or a ceiling of a building in which the worker 600 is performing the task. According to one embodiment, the projection system 150 can be mounted at a location that is at least 20 feet from the worker 600. According to one embodiment, the projection system 150 can be mounted at a location that is at least 50 feet from the worker 600. According to one embodiment, the projection system 150 can be mounted at a location that is at least 100 feet from the worker 600.

As shown in the illustrated embodiment, the worker 600 is performing a task, which involves positioning an item 700 in a location, for example loading the item 700 on a pallet or in a storage bin 800. While generally described in terms of a storage bin 800, the various implementations are not limited to storage bins, but may include pallets, trays, totes, conveyors, or any defined location whether visually delimited or not. The volume of space may include several storage bins, but only one of those storage bins, for example the storage bin 800, is the correct destination for the item 700. As the worker 600 approaches the storage bin 800, the projection system 150 delivers information to the worker 600 confirming that the correct destination for the item 700 is the storage bin 800.

Additionally, if the worker 600 approaches an incorrect destination for the item 700, for example a storage bin other than the storage bin 700, the projection system 150 delivers information to the worker 600 informing the worker 600 that they are approaching an incorrect destination for the item 700. Additionally, according to one embodiment the projection system 150 can deliver information to the worker 600 directing the worker 600 toward the correct destination for the item 700.

According to one embodiment, the projection system 150 projects visible light to the worker 600 to deliver the information. As shown in the illustrated embodiment, the projection system 150 can project the visible light onto the item 700. Alternatively, the projection system 150 can project the visible light in the vicinity, for example within line of sight, of the worker 600. The projection system 150 can be positioned to project the visible light within the volume of space, for example on a floor, on a wall, or both.

Figure 2:
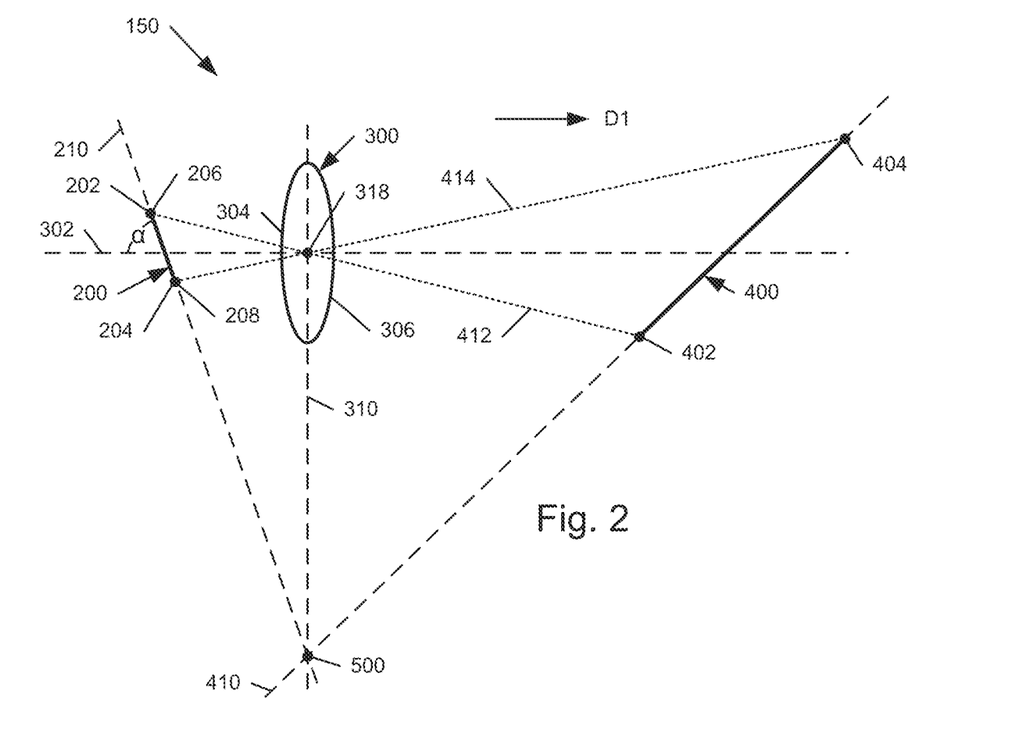
FIG. 2 is a side elevation view of a schematic of the projection system of FIG. 1, according to one embodiment.

Referring to FIGS. 1 and 2, the projection system 150 can one or more include one or more of the features described below to enhance the visibility and clarity of the visible light being delivered to the worker 600 over long ranges (such as when the projection system 150 is remote from the volume of space).

The projection system 150 includes a light source 200. As shown in the illustrated embodiment, the light source 200 can include a first end 202 and a second end 204 positioned relative to one another such that the light source 200 defines a length measured along a straight line from the first end 202 to the second end 204. According to one aspect of the disclosure, the light source 200 can be elongate along the length.

The light source 200 can include one or more lights that project visible light. As used herein the term, light (including "a light," "a plurality of lights," "one or more lights," and other derivations thereof) includes, but is not limited to: filament lamps, discharge lamps (for example high intensity discharge lamps), fluorescent lamps, light emitting diodes (for example organic light emitting diodes), and lasers. As shown in the illustrated embodiment, the light source 200 can include a plurality of lights including a first light 206 and a second light 208. According to one aspect of the disclosure, the first light 206 can be positioned near, for example at, the first end 202, and the second light 208 can be positioned near, for example at, the second end 204.

The light source 200 can define a light source plane 210 (shown as a line in FIG. 2 that extends into and out of the page) which intersects both the first light 206 and the second light 208. According to an aspect of the disclosure, the light source plane intersects each of the plurality of lights.

The projection system 150 includes a lens 300. The lens 300 can be any type of lens suitable for manipulating visible light emitted from the light source. According to one aspect of the disclosure, the lens 300 can be a concave lens (for example by biconcave or plano-concave) or a convex lens (for example biconvex or plano-convex). According to one aspect of the disclosure, the lens 300 can be spherical or aspherical. According to one aspect of the disclosure, the lens 300 can be thin or thick. According to one aspect of the disclosure, the lens 300 can be positive meniscus or negative meniscus. According to one aspect of the disclosure, the lens 300 can be converging or diverging. For example, the lens 300 can be a thin, convex, converging, aspherical lens.

According to one aspect of the disclosure, the projection system 150 can include a plurality of lenses such that the lens 300 is one of the plurality of lenses. The plurality of lenses can include lenses arranged in parallel, for example in an array such that a ray of light from the light source 200 passes through one of the plurality of lenses. The plurality of lenses can include lenses arranged in series such that a ray of light from the light source 200 passes through multiple ones of the plurality of lenses. Reference herein to structure or function of the lens 300 also includes multiple, separate lenses arranged to include the recited structure or function. For example, reference to first and second surfaces of the lens 300 includes two separate lens arranged such that one of the lenses includes the first surface and the other of the lenses includes the second surface.

Figure 3:
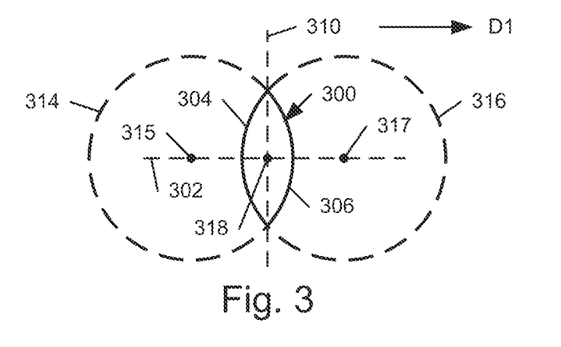
FIG. 3 is a side elevation view of a lens of the optical projection system of FIG. 2, according to one embodiment.

Referring to FIGS. 2 and 3, the lens 300 defines a principal axis 302, also referred to as an optical axis or a lens axis. According to one embodiment, the lens 300 can include at least one optically powered surface. As used herein, the term "optically powered surface" refers to a surface that converges or diverges light as the light passes through the surface. According to one aspect of the disclosure, the at least one optically powered surface includes at least one curved surface, for example a first curved surface 304, and a second curved surface 306. As shown in the illustrated embodiment, the first curved surface 306 can be opposite the second curved surface 308 with respect to a first direction D1. According to one aspect of the disclosure, the principal axis 302 can be parallel to the first direction D1.

According to one embodiment, the principal axis 302 passes through a center of curvature of at least one of the first curved surface 304 and the second curved surface 306. As shown in FIG. 3, for a spherical lens 300 the first curved surface 304 defines a portion of a sphere 314 and the principal axis 302 intersects a center 315 of the sphere 314. As shown in the illustrated embodiment, for the spherical lens 300 the second curved surface 306 can define a portion of a sphere 316 and the principal axis 302 intersects a center 317 of the sphere 316.

According to another embodiment, the at least one optically powered surface can include at least one substantially flat surface. For example, the lens 300 can include a Fresnel lens with a relatively flat surface (compared to that of a standard lens) that includes a series of concentric grooves.

According to an aspect of the disclosure, the principal axis 302 can be an axis of symmetry of the lens 300, for example, an axis along which there is a degree of rotational symmetry of the lens 300. For example, the lens 300 can define a circular shape with a center and the principal axis 302 can extend through the center of the circular shape.

According to an aspect of the disclosure, the principal axis 302 can perpendicularly intersect at least one of the first curved surface 304 and the second curved surface 306. The principal axis 302, according to one aspect of the disclosure, intersects an optical center 318 of the lens 300. According to one embodiment, the optical center 318 of the lens 300 is the point for which an incident direction of a ray of light passing through the lens 300 is parallel to the emergent direction. According to an embodiment, a ray of light which passes through the optical center 318 suffers no deviation as it passes through the lens 300.

The lens 300 can define a principal plane 310 (shown as a line in FIG. 2 that extends into and out of the page), also referred to herein as a lens plane. According to one aspect of the disclosure, the principal plane 310 is where all the refraction is considered to take place. For a thin lens 300, the principal plane 310 is typically in the center, for example the optical center 318, of the lens 300. As shown in the illustrated embodiment, the principal plane 310 can be normal to the principal axis 302. For a thick lens 300, the lens may define two principal planes 310, which are generally parallel to one another.

Referring once again to FIGS. 1 and 2, the light source 200 is positioned relative to the lens 300 such that the light source plane 210 is oblique to the principal plane 310 such that an angle α is defined between the light source plane 210 and the principal plane 310. The light source plane 210 and the principal plane 310 intersect along a line 500 (shown as a point in FIG. 2 that extends into and out of the page).

The projection system 150 defines a focal plane 410 which intersects both the light source plane 210 and the principal plane 310 along the line 500 such that a portion 400 of the focal plane 410 is opposite the light source 200 with respect to the lens 300 along the first direction D1. The visible light projected from the light source 200, through the lens 300, and to the focal plane 410 will be in focus within the portion 400.

As shown in the illustrated embodiment, the portion 400 extends from a first end 402, along the focal plane 410, to a second end 404. According to one aspect of the disclosure, the first end 402 is conjugate to the first light 206 of the light source 200 with respect to the optical center 318 of the lens 300. Thus, a straight line 412 that extends from the first light 206 and through the optical center 318 will intersect the focal plane 410 at the first end 402. Similarly the second end 404 is conjugate to the second light 206 of the light source 200 with respect to the optical center 318 of the lens 300. Thus, a straight line 414 that extends from the second light 208 and through the optical center 318 will intersect the focal plane 410 at the second end 404.

As shown, one of the first end 402 and the second end 404 is spaced from the principal axis 310 further, as measured along the first direction D1, than the other of the first end 402 and the second end 404 is from the principal axis 310. This result enables the projection system 150 to deliver information, for example visible light, to the worker 600 over a greater distance than known projection systems with similar components, cost, and power requirements. Additionally, the projection system 150, according to one embodiment, does not need to be stepped down, or limited in aperture as a way of extending the depth-of-field.

Referring to FIGS. 4 to 10, the light source 200 of the projection system 150 can include one or more of the exemplary light sources 220, 230, 240, 250, 260, 270, 280, as shown in the illustrated embodiments. According to one aspect of the disclosure, the light source 200 of the projection system 150 can include features shown in one or more of the exemplary light sources 220, 230, 240, 250, 260, 270, 280.

Figure 4:
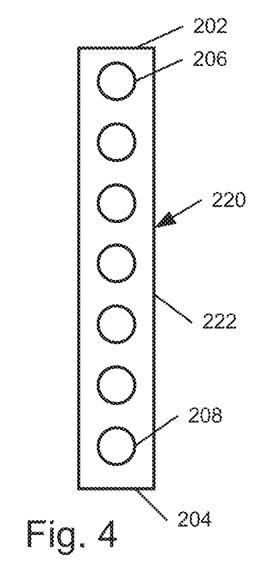
FIG. 4 is a front elevation view of a light source of the projection system of FIG. 2, according to one embodiment.

As shown in FIG. 4, the light source 220 includes a body 222 that extends from the first end 202 to the second end 204 and that supports the plurality of lights. The plurality of lights including the first light 206, the second light 208 and the remaining lights of the plurality of lights positioned between the first light 206 and the second light 208. The light source 220 includes a sparse array of the plurality of lights such that there is a gap between adjacent ones of the plurality of lights.

Figure 5:
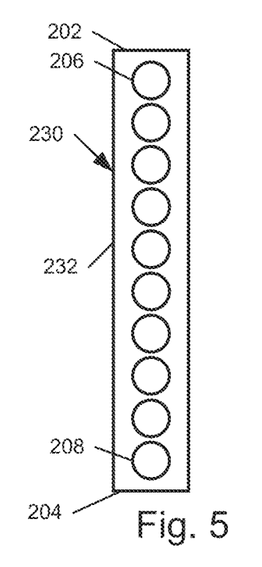
FIG. 5 is a front elevation view of a light source of the projection system of FIG. 2, according to another embodiment.

As shown in FIG. 5, the light source 230 includes a body 232 that extends from the first end 202 to the second end 204 and that supports the plurality of lights. The plurality of lights including the first light 202, the second light 204 and the remaining lights of the plurality of lights positioned between the first light 206 and the second light 208. The light source 220 includes a denser array of the plurality of lights compared to the light source 220.

Figure 6:
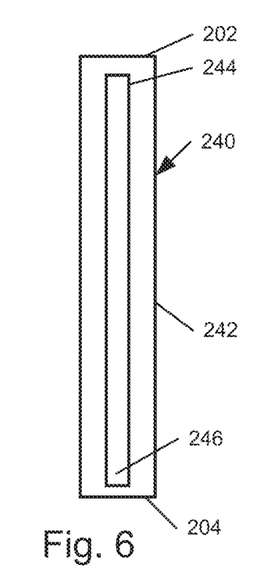
FIG. 6 is a front elevation view of a light source of the projection system of FIG. 2, according to another embodiment.

As shown in FIG. 6, the light source 240 includes a body 242 that extends from the first end 202 to the second end 204 and that supports the plurality of lights. According to one embodiment, the plurality of lights is arranged as an essentially continuous light, such as a circuit on board arrangement. In such an arrangement a first portion 244 of the continuous light can be interpreted as the first light 206, and a second portion 246 of the continuous light can be interpreted as the second light 208.

Although the plurality of lights of the light source 200 may be disposed in a linear arrangement (as shown in FIGS. 4 to 6), other arrangements or patterns are also contemplated.

Figure 7:
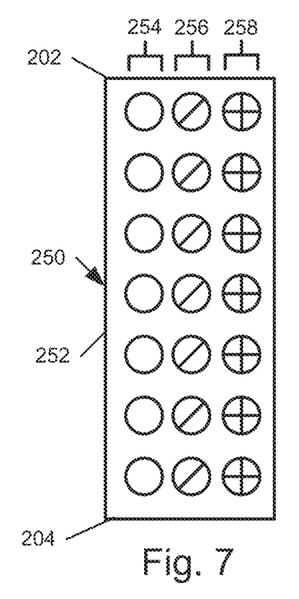
FIG. 7 is a front elevation view of a light source of the projection system of FIG. 2, according to another embodiment.

As shown in FIG. 7, the light source 250 includes a body 252 that extends from the first end 202 to the second end 204 and that supports the plurality of lights. The plurality of lights can include a plurality of columns of lights. As shown in the illustrated embodiment, the plurality of columns of lights includes a first column of lights 254, a second column of lights 256, and a third column of lights 258. Thus, a two-dimensional array of lights is also contemplated in embodiments of the disclosure. In some embodiments, the first, second, and third columns of lights 254, 256, 258 may be substantially aligned in linear rows and columns, whereas some lights in adjacent columns may be offset.

The plurality of columns of lights can include different characteristics to assist in delivering information to the worker 600. For example, each of the plurality of columns of lights can be a different color (represented by various line patterns within the plurality of lights shown in the illustrated embodiments). According to one embodiment, the first column of lights 254 can be green such that positive information or reinforcement can be delivered to the worker 600 by activation of the first column of lights 254. According to one embodiment, the second column of lights 256 can be red such that negative information or reinforcement can be delivered to the worker 600 by activation of the second column of lights 256. According to one embodiment, the third column of lights 258 can be yellow such that cautionary information or reinforcement can be delivered to the worker 600 by activation of the third column of lights 258. According to one embodiment, one or more of the lights include multi-color LEDs. It will be appreciated that other color and information combinations can be employed by the plurality of lights.

According to one embodiment, individual ones of the plurality of lights, or columns of the plurality of columns of lights can be toggled on and off in various patterns to deliver advanced information to the worker 600. For example, the plurality of lights can be toggled to create a chasing lights pattern to indicate a direction of desired movement.

Figure 8:
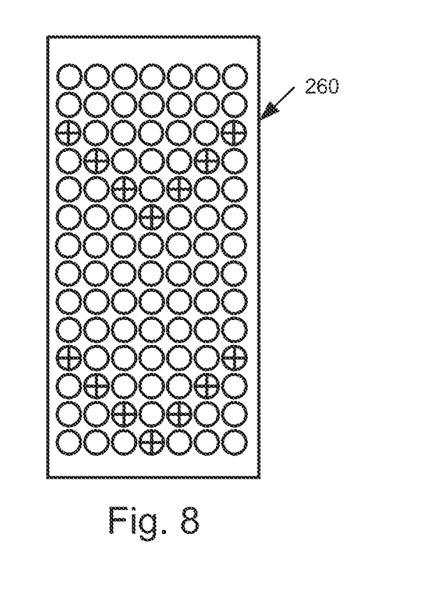
FIG. 8 is a front elevation view of a light source of the projection system of FIG. 2, according to another embodiment.
Figure 9:
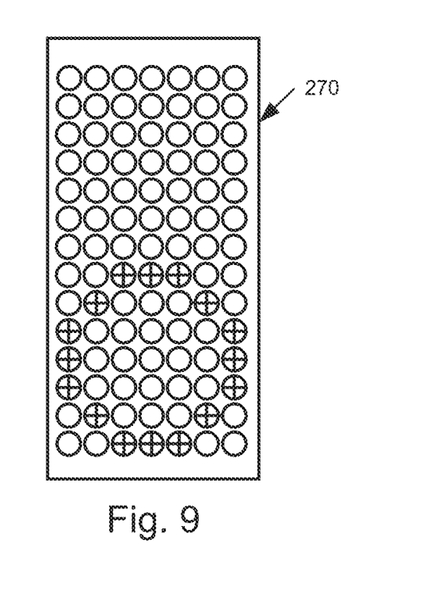
FIG. 9 is a front elevation view of a light source of the projection system of FIG. 2, according to another embodiment.
Figure 10:
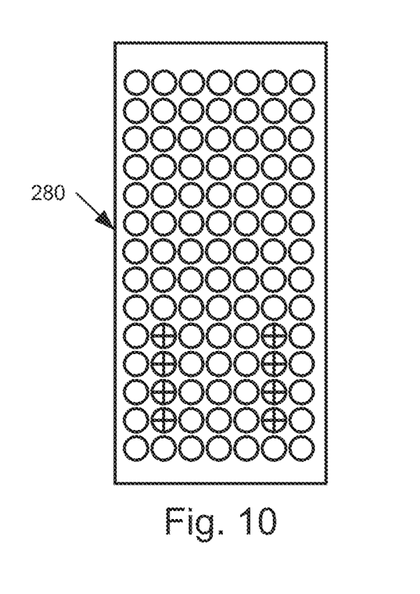
FIG. 10 is a front elevation view of a light source of the projection system of FIG. 2, according to another embodiment.

As shown in FIGS. 8 to 10, the light source 260, 270, 280 can include a sufficient number of columns of lights to display symbols, icons, characters, etc. which can also be animated, in various color combinations, or both. According to one aspect of the disclosure, the light source 260, 270, 280 can dynamically change one or more of the type, shape, location, orientation, etc. of the visible light being delivered to the worker 600.

Referring to FIGS. 1 to 11, the projection system 150 can be used in a method of projecting information to a first location 550. The method 550 can include at 552 positioning the lens 300 at a second location that is remote from and within line of sight of the first location. The lens 300 can include a curved surface, such as the first curved surface 304, and the lens defines an optical center, such as the optical center 318. The lens 300 further defines a lens axis, such as the lens axis 302, which intersects the first curved surface 304 at a point such that the lens axis 302 is normal to the first curved surface 304 at the point. The lens axis 302 can further intersect the optical center 318, and the lens can further define a lens plane, such as the lens plane 310, which is normal to the lens axis 302.

Figure 11:
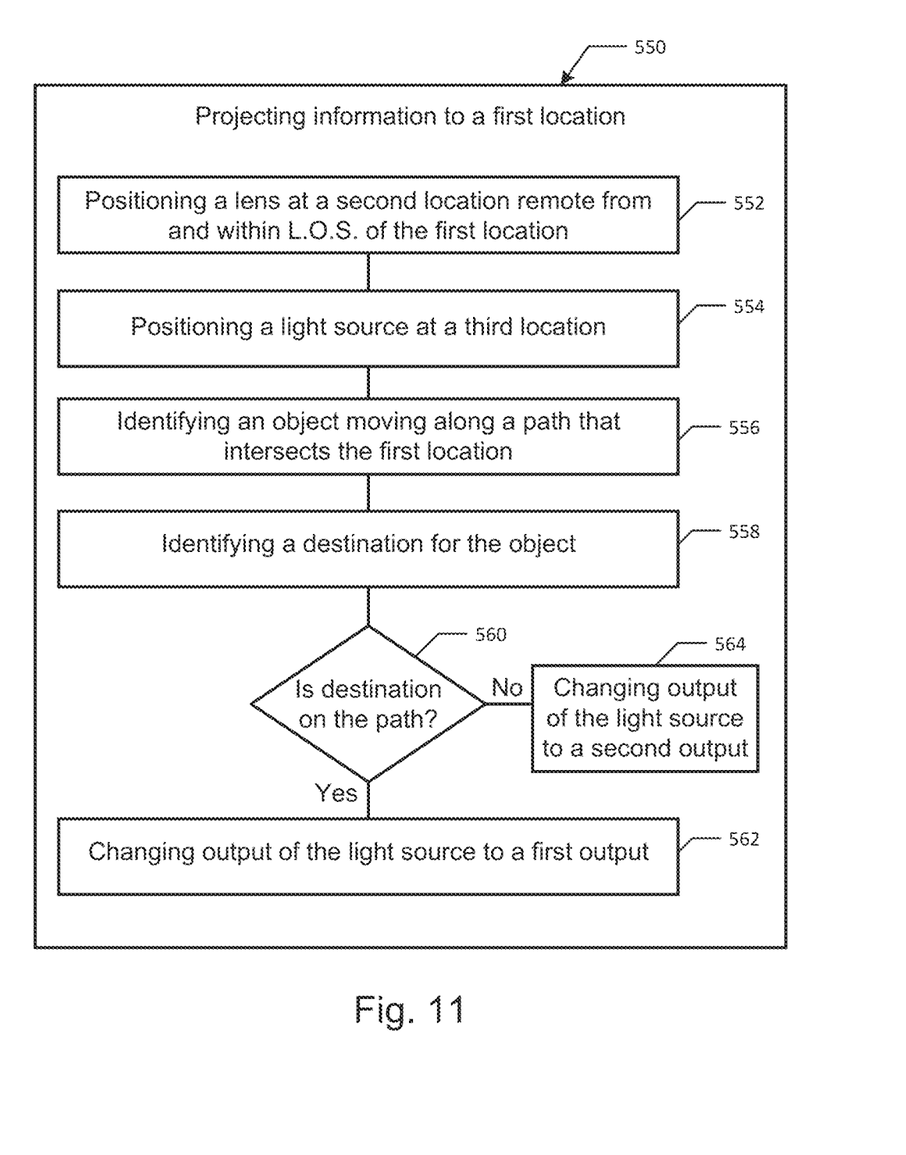
FIG. 11 is a block diagram illustrating an example of a method of projecting information to a first location.

The method 550 can further include at 554 positioning the light source 200 relative to the lens 300 at a third location such that a light source plane, such as the light source plane 210, is oblique to the lens plane 310. As shown, the light source plane 210 intersects both the first light 206 of the light source 200 and the second light 208 of the light source 200. The first light 206 is spaced from the second light 208 along a direction oblique to the lens axis 302.

The method 550 can further include positioning the lens 300 at the second location such that the lens axis 302 intersects a second curved surface of the lens 310, such as the second curved surface 306, at a second point such that the lens axis 302 is normal to the second curved surface 306 at the second point.

The method 550 can further include projecting light from the first light 206 through the lens 300, and projecting light from the second light 208 through the lens 300. The method 550 can further include orienting the light source 200 relative to the lens 300 thereby defining an angle, such as the angle α measured from the light source plane 210 to the lens plane 310. The method 550 can further include reorienting the light source 200 relative to the lens 300 thereby changing the angle α.

According to one embodiment, the lens plane 310 and the light source plane 210 intersect along the line of intersection 500, and the method 550 further includes selecting at least one of the second location, the third location, and the angle α such that the first location lies within the focal plane 400 that intersects both the lens plane and the light source plane along the line of intersection 500.

The method 550 can include selecting at least one of the second location, the third location, and the angle α such that the first location lies between the first point 402 on the focal plane 400 and the second point 404 on the focal plane 400, wherein the first point 402 is conjugate with the first light 206 with respect to the optical center 318 of the lens 300, and the second point 404 on the focal plane 400 is conjugate with the second light 208 with respect the optical center 318 of the lens 300. The method 550 can include changing a distance from the light source 200 to the lens 300 measured along the lens axis 302.

The method 550 can further include at 556 identifying an object, such as the object 700, moving along a path that intersects the first location at 558; identifying a destination for the object 700; and at 560 determining whether the destination is located on the path. According to one aspect of the disclosure, identifying the object 700 includes capturing an image of the object and analyzing the captured image. Analyzing the captured image can include comparison of the captured image with a catalog of stored images. According to an aspect of the disclosure, identifying the object 700 includes sending a signal to the object 700, receiving a signal from the object 700, or both. For example the object 700 may include an RFID tag, for example an active RFID tag or a passive RFID tag, including identification information about the object 700.

The method 550 can include changing an output of the light source 200 based on an outcome of whether the destination is located on the path at 560. According to one embodiment, changing the output of the light source 200 includes at least one of: changing a color of at least one of the first light 206 and the second light 208; transitioning at least one of the first light 206 and the second light 208 from on to off; and transitioning at least one of the first light 206 and the second light 208 from off to on. The method 550 can include at 562 changing the output of the light source 200 to a first output if the destination is located on the path; and at 564 changing the output of the light source 200 to a second output, which is different than the first output, if the destination in not located on the path.

Referring to FIGS. 1 to 10 and 12, the projection system 150 can be used in a method of providing information to a worker 600 performing a task about the task being performed 570. The method 570 can include at 572 positioning the lens 300 such that the lens 300 is remote from a path along which the worker 600 travels during performance of the task. The lens 300 including an optically powered surface, the lens 300 defining an optical center 318 and a lens axis 302, the lens axis 302 intersecting the optically powered surface and the optical center 318 such that the lens 300 defines a degree of rotational symmetry along the lens axis 302, and the lens further defining a lens plane 310 that is normal to the lens axis 302.

Figure 12:
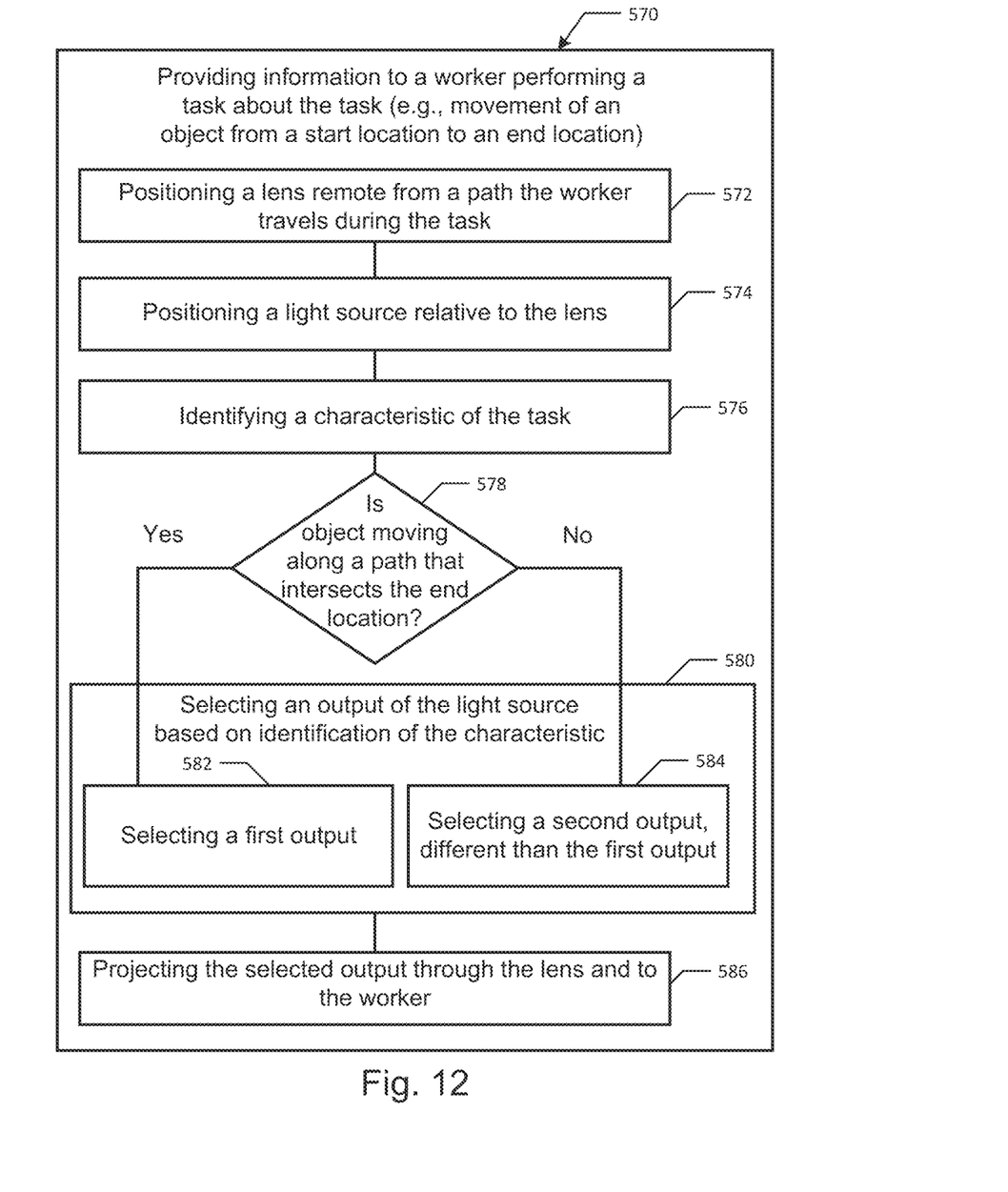
FIG. 12 is a block diagram illustrating an example of a method of providing information to a worker performing a task about the task being performed.

The method 570 further includes at 574 positioning the light source 200 relative to the lens 300 such that a light source plane 210 is oblique to the lens plane 310, wherein the light source plane 210 intersects both the first light 206 of the light source 200 and the second light 208 of the light source 200, the first light 206 spaced from the second light 208 along a direction oblique to the lens axis 302. The method 570 further includes at 576 identifying a first characteristic of the task being performed, at 580 selecting one output of the light source 200 of a plurality of outputs of the light source 200 based on a result of identifying the first characteristic; and projecting the one output from the light source 200, through the lens 300, and to the worker 600.

The task being performed during the method 570 may be movement of an object from a start location to an end location. Identifying the characteristic at 576 may include at 578 determining whether the object is moving along a path that intersects the end location. Selecting the one output at 580 may include at 582 selecting a first output if the object is moving along a path that intersects the end location, and at 584 selecting a second output, that is different from the first output, if the object is moving along a path that does not intersect the end location.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

Many of the methods described herein can be performed with variations. For example, many of the methods may include additional acts, omit some acts, and/or perform acts in a different order than as illustrated or described.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A projection system comprising:
   a lens including a first optically powered surface, the lens defining an optical center and a lens axis, the lens axis intersecting the first optically powered surface and the optical center such that the lens defines a degree of rotational symmetry along the lens axis, and the lens further defining a lens plane that is normal to the lens axis, wherein the first optically powered surface forms a portion of a sphere having a center that is located on the lens axis; and
   a light source positioned to intersect the lens axis, the light source including a plurality of lights arranged in a sparse array such that adjacent ones of the plurality of lights are separated by a gap, the plurality of lights including a first light and a second light, which each emit light independently of the other of the first light and the second light, the first light spaced from the second light along a direction oblique to the lens axis, and the light source defining a light source plane that intersects both the first light and the second light,
   wherein the light source plane is oblique to the lens plane, and the projection system is devoid of any optically powered surfaces, other than the first optically powered surface, that intersect the lens axis and that are positioned between the light source and the optical center.

2. The projection system of claim 1 wherein the sphere is a first sphere, the center is a first center, the lens includes a second optically powered surface, opposite the first optically powered surface along the lens axis with respect to the optical center, and the second optically powered surface forms a portion of a second sphere having a second center that is located on the lens axis.

3. The projection system of claim 1 wherein the lens axis intersects the first optically powered surface at a point such that the lens axis is normal to the first optically powered surface at the point.

4. The projection system of claim 3 wherein the point is a first point, the lens further comprises a second optically powered surface opposite the first optically powered surface along the lens axis with respect to the optical center, and the lens axis intersects the second optically powered surface at a second point such that the lens axis is normal to the second optically powered surface at the second point.

5. The projection system of claim 1 wherein the lens axis intersects the light source at a location between the first light and the second light with respect to the light source plane.

6. The projection system of claim 1 wherein:
the first light includes at least one of: a filament lamp, a discharge lamp, a fluorescent lamp, a light emitting diode, and a laser; and
the second light includes at least one of: a filament lamp, a discharge lamp, a fluorescent lamp, a light emitting diode, and a laser.

7. A method of projecting information to a first location, the method comprising:
positioning a lens at a second location that is remote from and within line of sight of the first location, the lens including a first optically powered surface, the lens defining an optical center and a lens axis, the lens axis intersecting the first optically powered surface and the optical center such that the lens defines a degree of rotational symmetry along the lens axis, and the lens further defining a lens plane that is normal to the lens axis;
positioning a light source relative to the lens at a third location such that a light source plane is oblique to the lens plane, wherein the light source plane intersects a plurality of lights of the light source, the plurality of lights arranged in a sparse array such that adjacent ones of the plurality of lights are separated by a gap, the plurality of lights including a first light and a second light, wherein the first light is spaced from the second light along a direction oblique to the lens axis, and each of the first light and the second light emit light independently of the other of the first light and the second light; and
emitting light from the first light along a path that intersects the first optically powered surface of the lens, wherein the path is devoid of any optically powered surfaces, other than the first optically powered surface, positioned between the first light and the optical center.

8. The method of claim 7 wherein the optically powered surface includes a plurality of concentric rings centered on the lens axis.

9. The method of claim 7 wherein the optically powered surface is a curved surface, and the lens axis intersects the curved surface at a point such that the lens axis is normal to the curved surface at the point.

10. The method of claim 9 wherein the curved surface is a first curved surface and the point is a first point, the method further comprising:
positioning the lens at the second location such that the lens axis intersects a second curved surface of the lens at a second point such that the lens axis is normal to the second curved surface at the second point.

11. The method of claim 7, further comprising:
projecting light from the first light through the lens; and
projecting light from the second light through the lens.

12. The method of claim 7, further comprising:
orienting the light source relative to the lens thereby defining an angle measured from the light source plane to the lens plane.

13. The method of claim 12, further comprising:
reorienting the light source relative to the lens thereby changing the angle.

14. The method of claim 12 wherein the lens plane and the light source plane intersect along a line of intersection, the method further comprising:
selecting at least one of the second location, the third location, and the angle such that the first location lies between a first point on the focal plane and a second point on the focal plane, wherein the first point on the focal plane is conjugate with the first light with respect to the optical center of the lens, and the second point on the focal plane is conjugate with the second light with respect the optical center of the lens.

15. The method of claim 7, further comprising:
identifying an object moving along a path that intersects the first location;
identifying a destination for the object; and
determining whether the destination is located on the path.

16. The method of claim 15, further comprising:
changing an output of the light source based on an outcome of whether the destination is located on the path.

17. The method of claim 16, further comprising:
changing the output of the light source to a first output if the destination is located on the path; and
changing the output of the light source to a second output, which is different than the first output, if the destination is not located on the path.

18. A method of providing information to a worker performing a task about the task being performed, the method comprising:
positioning a lens such that the lens is remote from a path along which the worker travels during performance of the task, the lens including a first optically powered surface, the lens defining an optical center and a lens axis, the lens axis intersecting the first optically powered surface and the optical center such that the lens defines a degree of rotational symmetry along the lens axis, and the lens further defining a lens plane that is normal to the lens axis;
positioning a light source relative to the lens such that a light source plane is oblique to the lens plane, wherein the light source plane intersects a plurality of lights arranged in a sparse array such that adjacent ones of the plurality of lights are separated by a gap, the plurality of lights including a first light and a second light, the first light spaced from the second light along a direction oblique to the lens axis, and each of the first light and the second light emit light independently of the other of the first light and the second light;
identifying a first characteristic of the task being performed;
selecting one output of the light source of a plurality of outputs of the light source based on a result of identifying the first characteristic; and
projecting the one output from the light source along a path, through the lens, and to the worker, wherein the path is devoid of any optically powered surfaces, other than the first optically powered surface, positioned between the light source and the optical center.

19. The method of claim 18 wherein:
the task being performed is movement of an object from a start location to an end location;
identifying the first characteristic includes determining whether the object is moving along a path that intersects the end location; and
selecting the one output includes:
selecting a first output if the object is moving along a path that intersects the end location; and
selecting a second output, that is different from the first output, if the object is moving along a path that does not intersect the end location.

* * * * *